United States Patent
Shin et al.

(10) Patent No.: US 11,050,502 B2
(45) Date of Patent: Jun. 29, 2021

(54) METHOD AND APPARATUS FOR NETWORK ASSISTED INTERFERENCE CANCELLATION AND SUPPRESSION IN WIRELESS CELLULAR COMMUNICATION SYSTEM

(71) Applicant: Samsung Electronics Co., Ltd., Gyeonggi-do (KR)

(72) Inventors: Cheolkyu Shin, Gyeonggi-do (KR); Younsun Kim, Gyeonggi-do (KR); Hoondong Noh, Gyeonggi-do (KR); Youngwoo Kwak, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 179 days.

(21) Appl. No.: 16/341,785

(22) PCT Filed: Oct. 16, 2017

(86) PCT No.: PCT/KR2017/011414
§ 371 (c)(1),
(2) Date: Apr. 12, 2019

(87) PCT Pub. No.: WO2018/070853
PCT Pub. Date: Apr. 19, 2018

(65) Prior Publication Data
US 2021/0067261 A1  Mar. 4, 2021

(30) Foreign Application Priority Data
Oct. 14, 2016 (KR) .................. 10-2016-0133371

(51) Int. Cl.
*H04J 11/00* (2006.01)
*H04L 5/00* (2006.01)
(Continued)

(52) U.S. Cl.
CPC ........ *H04J 11/0056* (2013.01); *H04L 5/0051* (2013.01); *H04L 27/2613* (2013.01); *H04W 24/02* (2013.01); *H04J 2211/005* (2013.01)

(58) Field of Classification Search
None
See application file for complete search history.

(56) References Cited

U.S. PATENT DOCUMENTS

| 9,584,293 B2 * | 2/2017 | Li ..................... H04L 25/0204 |
| 2014/0003327 A1 | 1/2014 | Seo et al. |

(Continued)

FOREIGN PATENT DOCUMENTS

| CN | 104703205 | 6/2015 |
| KR | 1020150038371 | 4/2015 |

(Continued)

OTHER PUBLICATIONS

PCT/ISA/210 Search Report issued on PCT/KR2017/011414 (pp. 13).
PCT/ISA/237 Written Opinion issued on PCT/KR2017/011414 (pp. 5).

*Primary Examiner* — Hong S Cho
(74) *Attorney, Agent, or Firm* — The Farrell Law Firm, P.C.

(57) ABSTRACT

The disclosure relates to a 5G or pre-5G communication system which will be provided to support a higher data rate beyond a 4G communication system such as LTE. According to an embodiment of the disclosure, a method performed by a terminal in a wireless cellular communication system is provided. The method comprises the steps of: receiving, from a serving base station, network deployment information of a neighboring cell, which includes information on the type of the neighboring cell; and receiving data from the
(Continued)

serving base station on the basis of the network deployment information of the neighboring cell.

15 Claims, 11 Drawing Sheets

(51) Int. Cl.
H04L 27/26 (2006.01)
H04W 24/02 (2009.01)

(56) References Cited

U.S. PATENT DOCUMENTS

| | | | |
|---|---|---|---|
| 2014/0092731 | A1 | 4/2014 | Gupta |
| 2015/0009794 | A1* | 1/2015 | Damnjanovic ....... H04W 24/10 370/201 |
| 2015/0271830 | A1 | 9/2015 | Shin et al. |
| 2015/0282190 | A1 | 10/2015 | Jung et al. |
| 2015/0372796 | A1* | 12/2015 | Lee ....................... H04W 48/00 370/330 |
| 2016/0021565 | A1 | 1/2016 | Kim et al. |

FOREIGN PATENT DOCUMENTS

| | | |
|---|---|---|
| KR | 1020150082213 | 7/2015 |
| KR | 1020150109709 | 10/2015 |
| KR | 1020150135210 | 12/2015 |
| WO | WO-2015115828 A1 * 8/2015 ............. H04B 17/21 |

* cited by examiner

METHOD AND APPARATUS FOR NETWORK ASSISTED INTERFERENCE CANCELLATION AND SUPPRESSION IN WIRELESS CELLULAR COMMUNICATION SYSTEM

PRIORITY

This application is a National Phase Entry of PCT International Application No. PCT/KR2017/011414 which was filed on Oct. 16, 2017, and claims priority to Korean Patent Application No. 10-2016-0133371, which was filed on Oct. 14, 2016, the content of each of which is incorporated herein by reference.

BACKGROUND

1. Field

The disclosure relates to a wireless communication system, and more particularly, to a method and an apparatus in which a base station shares information on an interference signal with a terminal through a network, and the terminal applies a network assisted interference cancellation and suppression (NAICS) technology to cancel and suppress interferences using the information.

2. Related Art

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post long term evolution (post LTE) system. In order to achieve high data transmission rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive multiple-input multiple-output (MIMO), full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid FSK and QAM modulation (FQAM) and sliding window superposition coding (SWSC), which correspond to advanced coding modulation (ACM) systems, and filter bank multi-carrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, technologies of a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Further, various attempts have been made to apply the 5G communication system to IoT networks. For example, technologies of sensor network, M2M, and MTC have been implemented by techniques for beamforming, MIMO, and array antennas, which correspond to the 5G communication technology. As the big data processing technology as described above, application of a cloud radio access network would be an example of convergence between the 5G technology and the IoT technology.

In general, interference is the biggest factor in hindering the system performance in a cellular mobile communication system, and it may determine the system performance how to properly control the interference. A method for controlling the interference may be a network assisted interference cancellation and suppression (NAICS) technology supported by LTE Rel-12. In the NAICS technology, a base station shares information on an interference signal with a terminal through a network, and the terminal cancels and suppresses the interference using the information. Even in a new radio (NR) system that is a 5G wireless communication system, it is very important to improve the system performance through an effective interference control. First of all, since a frame structure and a signal transmission method of the NR are different from those of the LTE, respectively, it is necessary for the base station to share the information on the interference signal suitable to the NR with the terminal through the network.

An aspect of the disclosure is to provide a method for supporting network assisted interference cancellation and suppression (NAICS) in a new radio (NR) system. In the NR system, transmission parameters necessary for application of effective NAICS technology are proposed.

The disclosure considers the point that interference occurrence time and frequency units may not be fixed in a new radio (NR) system in contrast with a long term evolution (LTE) system. The disclosure considers the point that a control signal may not be transmitted in the range of an always fixed area in an NR system in contrast with an LTE system. The disclosure considers that various demodulation reference signal (DM-RS) structures are supported in an NR system. The disclosure considers the situation in which an LTE system and an NR system coexist. Further, the disclosure considers application of network assisted interference cancellation and suppression (NAICS) with respect to not only a data channel but also a control channel.

In accordance with an aspect of the disclosure, a method by a terminal in a wireless cellular communication system is provided. The method includes receiving, from a serving base station, network deployment information of a neighboring cell including information on a type of the neighboring cell; and receiving data from the serving base station based on the network deployment information of the neighboring cell.

In accordance with another aspect of the disclosure, a terminal in a wireless cellular communication system is provided. The terminal includes a transceiver configured to receive a signal from a base station and to transmit a signal to the base station; and a processor configured to control to receive, from the base station, network deployment information of a neighboring cell including information on a type of the neighboring cell and to receive data from the base station based on the network deployment information of the neighboring cell.

In accordance with still another aspect of the disclosure, a method by a base station in a wireless cellular communication system is provided. The method includes acquiring network deployment information of a neighboring cell including information on a type of the neighboring cell; and transmitting the network deployment information of the neighboring cell to a terminal.

In accordance with yet still another aspect of the disclosure, a base station in a wireless cellular communication system is provided. The base station includes a transceiver configured to receive a signal from a terminal and to transmit a signal to the terminal; and a processor configured to control to acquire network deployment information of a neighboring cell including information on a type of the neighboring cell and to transmit the network deployment information of the neighboring cell to the terminal.

According to the aspects of the disclosure, in the new radio (NR) that is the 5G wireless communication system, since the terminal receives information that renders help in controlling the interference from the network, complexity required for the interference control can be reduced, and accuracy for the interference control can be heightened. Accordingly, the system performance is improved.

DETAILED DESCRIPTION

Figure 1:
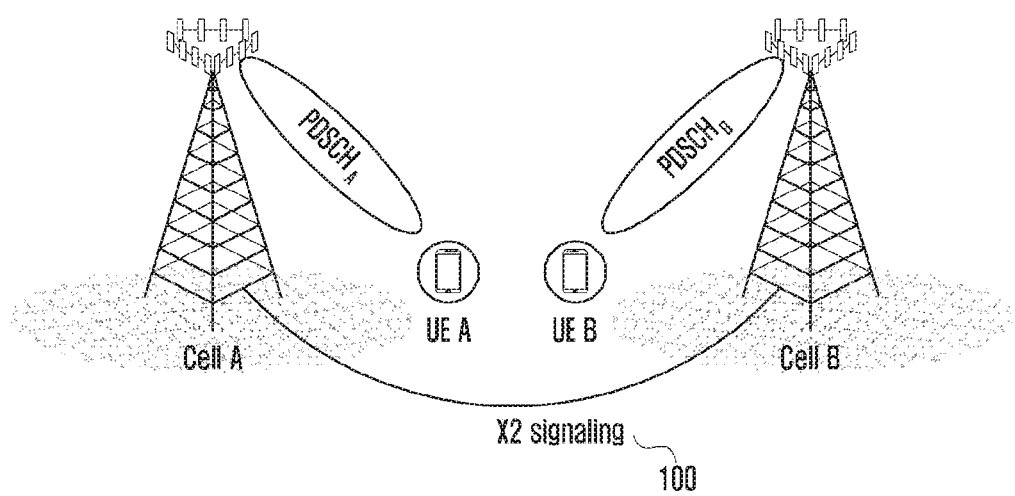
FIG. 1 is a diagram explaining a situation in which network assisted interference cancellation and suppression (NAICS) introduced by LTE Rel(release)-12 is applied.

Hereinafter, embodiments of the disclosure will be described in detail with reference to the accompanying drawings. In describing the disclosure, related well-known functions or configurations incorporated herein are not described in detail in case where it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined on the basis of the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

Hereinafter, a base station (BS) is the subject that performs resource allocation with respect to a terminal, and may be at least one of gNode B (gNB), eNode B (eNB), Node B (NB), radio access unit, base station controller, and node on a network. A terminal may include user equipment (UE), mobile station (MS), cellular phone, smart phone, computer, or multimedia system capable of performing a communication function. In the disclosure, downlink (DL) means a radio transmission path of a signal that the base station transmits to the terminal, and uplink (UL) means a radio transmission path of the signal that the terminal transmits to the base station.

A wireless communication system was initially developed for the purpose of providing a voice-oriented service, but has been developed as a broadband wireless communication system that provides a high-speed and high-quality packet data service like communication standards, such as 3rd Generation Partnership Project (3GPP) high speed packet access (HSPA), Long Term Evolution (LTE), evolved universal terrestrial radio access (E-UTRA), LTE-advanced (LTE-A), 3GPP2 high rate packet data (HRPD), ultra-mobile broadband (UMB), and Institute of Electrical and Electronics Engineers (IEEE) 802.16e.

FIG. 1 illustrates a situation in which network assisted interference cancellation and suppression (NAICS) introduced by LTE Rel (release)-12 is applied.

In LTE Rel-12, the NAICS has been introduced to cancel or suppress interference for a data channel from an adjacent cell as illustrated in FIG. 1. In order to perform the NAICS, as illustrated in FIG. 1, base stations exchange interference parameters between base stations through X2 signaling 100, and transmit at least parts of the interference parameters, that is, interference information, to terminals through higher layer signaling. Further, terminals can acquire non-signaled interference parameters through blind detection. In LTE Rel-12 as described above, dynamic network support for interference control is not considered. However, in an NR system, it is necessary to improve the system performance to cope with an interference change more rapidly through the dynamic network cooperation and the interference control through this.

Figure 2:
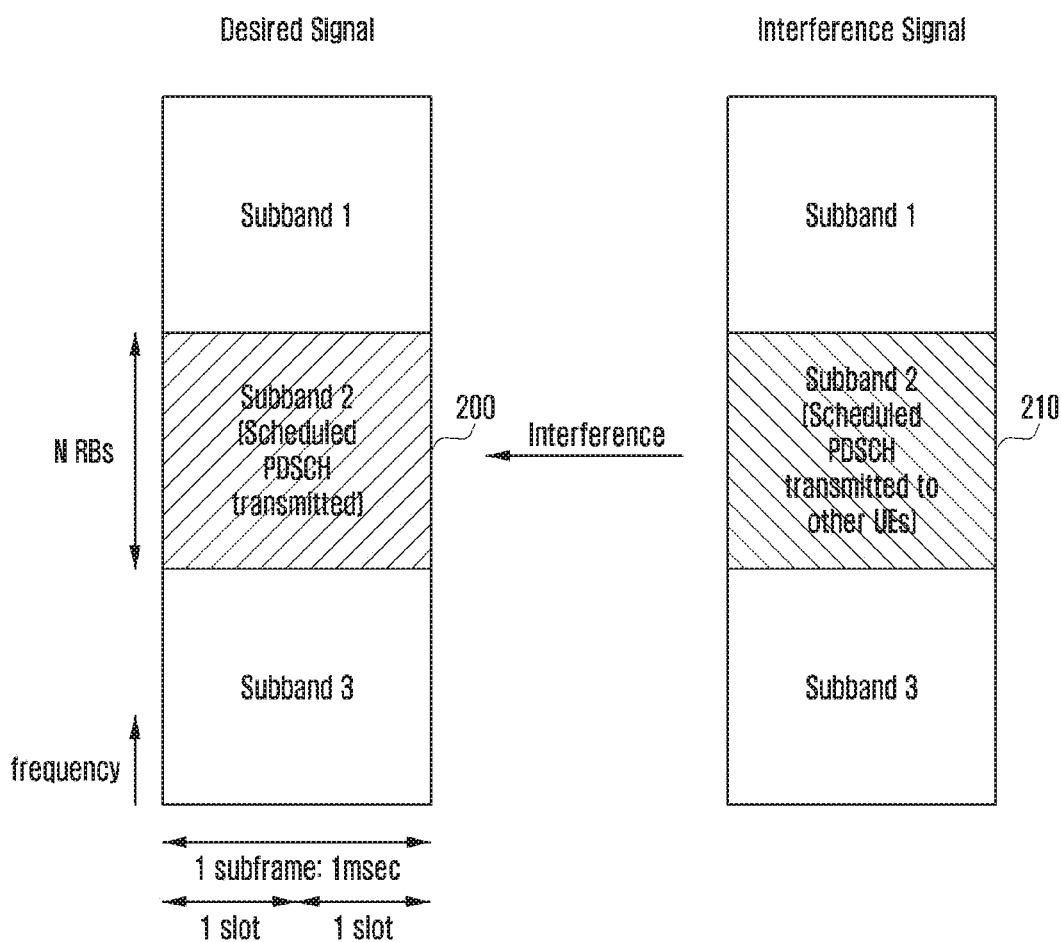
FIG. 2 is a diagram explaining interference occurring in an LTE/LTE-A system.

FIG. 2 is a diagram explaining interference occurring in an LTE/LTE-A system.

A terminal intends to receive a signal 200. In this case, a signal 210 transmitted for another terminal causes interference to occur with respect to the terminal. It is assumed that the desired signal 200 that the terminal intends to receive and the interference signal 210 are transmitted from N RBs. As illustrated in FIG. 2, in an LTE system, data transmission is performed basically in the unit of subframe of 1 ms. A physical downlink control channel (PDCCH) is always located in the range of a fixed resource area. Further, the NAICS introduced by LTE Rel-12 considers only the interference on a physical downlink shared channel (PDSCH). However, in the NR system, the unit of data transmission may be configured differently from the LTE. For example, one slot rather than a subframe may be a basic unit of data transmission, or data transmission may be performed through aggregation of several slots. Further, various numerologies are supported in the NR system, and in case of using different subcarrier spacing, data transmission time and frequency units may also differ. Accordingly, in the NR system, there is a problem that the interference occurrence time and frequency units may not be fixed in contrast with the LTE. Further, in the NR system, a control signal may not be transmitted at a fixed location in contrast with the LTE. For example, if needed, a control channel, such as PDCCH, may be located in a specific area of a data channel, such as PDSCH. Accordingly, in the NR, as compared with the LTE, it may be difficult for a terminal to perform rate matching through blind detection of a control channel area of an interference cell. Further, a demodulation reference signal (DM-RS) is transmitted at a fixed location in the LTE system, whereas various DM-RS structures can be supported in accordance with a transmission environment in the NR system. Accordingly, in the NR system, the interference control should be performed in consideration of the point that the interference cell may be transmitted with a different DM-RS structure. However, this may cause a problem that complexity of blind detection of the terminal becomes heightened as compared with the LTE.

In order to heighten the reception performance in the process of detecting a signal intended to be received, it is required to calculate a log likelihood ratio (LLR) of a received signal after accurately calculating a conditional probability distribution function in which the statistical characteristics of the interference signal are reflected, or it is required to calculate the LLR of the received signal after cancelling the interference signal. First, in the k-th resource element (RE), a received signal vector $y_k$ of the terminal may be expressed as in the following mathematical expression 1.

$$y_k = H_k^S x^S + H_k^I x^I + w \qquad \text{Mathematical expression 1}$$

In the mathematical expression 1, $H_k^S$ denotes a channel from a base station accessed by a terminal to the terminal in the k-th RE, and $x^S$ denotes a transmitted signal vector transmitted by the base station. $H_k^I$ denotes a channel on which an interference signal is transmitted in the k-th RE, $x^I$ denotes an interference signal vector, and w denotes a Gaussian noise having variance of $\sigma^2$. If the m-th symbol is denoted by y in the received signal vector $y_k$ in the mathematical expression 1, the LLR for the i-th bit of x when symbol x is transmitted can be obtained from the following mathematical expression 2 by definition.

$$LLR_i = \ln \frac{P(y|b_i=0)P(b_i=0)}{P(y|b_i=1)P(b_i=1)} \qquad \text{Mathematical expression 2}$$

In the mathematical expression 2, $b_i$ denotes the i-th bit of transmitted symbol x, and $P(y|b_i=0)$ and $P(y|b_i=1)$ denote probability distribution functions of a received signal y when $b_i$ is transmitted as 0 or 1, respectively. Further, $P(b_i=0)$ and $P(b_i=1)$ denote probability that $b_i$ is 0 and 1, respectively. If $P(b_i=0)$ and $P(b_i=1)$ are equal to each other, $P(b_i=0)$ and $P(b_i=1)$ and can be omitted from the mathematical expression 2. As described above, in order to heighten the reception performance in the process of detecting the signal intended to be received, it is required to calculate the LLR of the received signal after accurately calculating the conditional probability distribution function in which the statistical characteristics of the interference signal are reflected, or it is required to calculate the LLR of the received signal after cancelling the interference signal. For example, on the assumption of a symbol level maximum likelihood (SLML) receiver, the LLR can be calculated from the conditional probability distribution function in which the statistical characteristics of the interference signal are reflected. Specifically, if it is assumed that a transmitted signal transmitted from a base station accessed by a terminal to the terminal is denoted by $x^S$, and an interference signal is denoted by $x^I$, the LLR of the mathematical expression 2 can be calculated as in the following mathematical expression 3.

$$LLR_i = \ln \frac{P(b_i=0)\sum_{x^I}\sum_{x^S \in S_i^0} P(y|x^S, x^I)}{P(b_i=1)\sum_{x^I}\sum_{x^S \in S_i^1} P(y|x^S, x^I)} \qquad \text{Mathematical expression 3}$$

In the mathematical expression 3, $S_i^0$ and $S_i^1$ denote gray mapping sets for $x^S$ in all possible cases where $b_i$ becomes 0 or 1 in the mathematical expression 2. For example, if $x^S$ is QPSK-modulated, the gray mapping sets become $S_1^0=\{01,00\}$, $S_1^1=\{10,11\}$, $S_2^0=\{00,10\}$, and $S_2^1=\{01,11\}$. In contrast, on the assumption of a symbol level interference cancellation (SLIC) receiver, the LLR of the received signal can be calculated after the interference signal is cancelled from the mathematical expression 1. In order to calculate the LLR as described above, it is required to be aware of at least the modulation type of the interference signal and the reception strength of the interference signal.

As described above, in LTE Rel-12, since the terminal is made to grasp the interference signal information through the network support, the reception performance can be heightened in the process of detecting the signal intended to be received. Specifically, the following transmission parameters can be configured in network support higher layer signaling so that the terminal can identify the modulation type of the interference signal and the reception strength of the interference signal.

Cell-specific reference signal (CRS) information of an interference cell

Cell ID

The number of CRS antenna ports: 1, 2, 4

Multimedia broadcast multicast services (MBSFN) subframe information

Data RE to CRS EPRE ratio information: PA, PB as per [TS 36.213 5.2 Section]

Scheduling information of an interference cell

Resource allocation for PDSCH interference and precoding granularity are assumed in the unit of a physical resource block (PRB) pair {1,2,3,4}.

Transmission mode (TM) of interference PDSCH
Supported TM information: TM1, TM2("fallback" mode), TM3, TM4, TM6, TM8, TM9, TM10

A beyond LTE future communication system, that is, a 5G communication system, aims at high transmission efficiency as compared with the existing communication system. In consideration of resources on usable time/frequency/space, interference control is very important to maximize the transmission efficiency. In a 4G LTE system, the system performance is improved by heightening accuracy of the interference control by a terminal through NAICS support. However, a 5G NR system has a problem that an interference control environment is more complicated as compared with the 4G LTE system. As described above, in the NR system, interference occurrence time and frequency units may not be fixed in contrast with the LTE system, and a control signal may not be transmitted in the range of a fixed area. Further, since various DM-RS structures are supported, the terminal should additionally perform blind detection with respect to the DM-RS structure of the interference cell. Further, there may be a coexistence situation in which the NR system and the LTE system use the same frequency band.

Figure 3A:
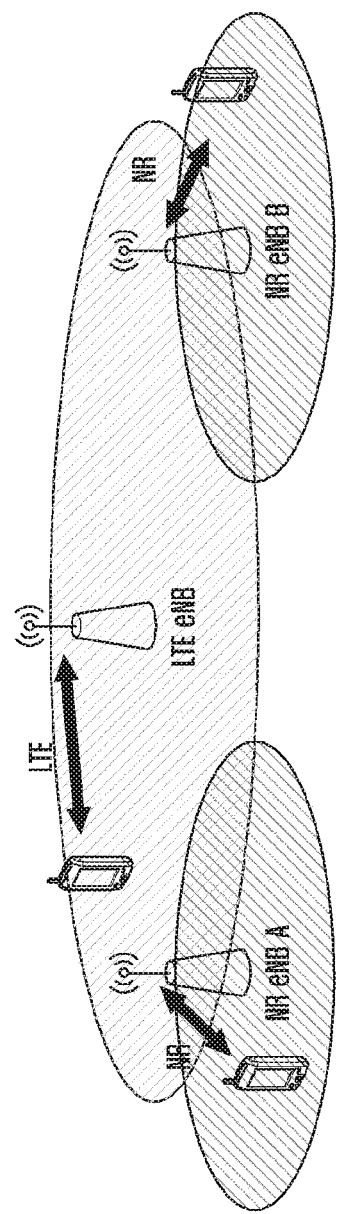
FIGS. 3A and 3B are diagrams explaining a situation in which an NR system and an LTE system coexist.
Figure 3B:
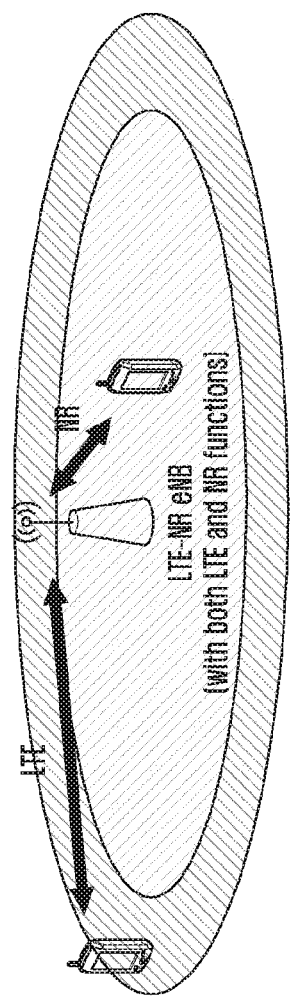

FIGS. 3A and 3B are diagrams explaining a situation in which an NR system and an LTE system coexist. Specifically, FIG. 3A shows a deployment scenario in which one base station supports an LTE system or an NR system, that is, an LTE base station and an NR base station exist separately, and FIG. 3B shows a deployment scenario in which one base station supports both an LTE system and an NR system.

In case where one operator deploys base stations, it is general that one base station supports both the LTE system and the NR system as in the scenario of FIG. 3B, but according to circumstances, there may be the deployment scenario in which the LTE base station and the NR base station exist, respectively, as shown in FIG. 3A. For example, in case of considering cooperation between base stations of different operators, the deployment scenario as shown in FIG. 3A should be assumed.

The disclosure proposes a network support method for effectively controlling the interference in consideration of the interference situation in the NR system that is different from the LTE system. Specifically, the disclosure considers that interference occurrence time and frequency units may not be fixed in the NR system in contrast with the LTE system. The disclosure considers that a control signal may not be transmitted in the range of a fixed area in the NR system in contrast with the LTE system. The disclosure considers that various DM-RS structures are supported in the NR system. The disclosure considers the situation in which the LTE system and the NR system coexist. Further, the disclosure considers application of the NAICS even to the control channel.

Embodiment 1

Embodiment 1 proposes a network support that is necessary for effective interference control in an NR system considered in the disclosure. Specifically, a base station shares interference signal information with a terminal through a network, and the terminal applies NAICS using the information. The NR system has a frame structure and a signaling method that are designed differently from those of an LTE system, and thus information to be shared through the network may also differ from each other. First, since a CRS is not considered in the NR system, CRS information of an interference cell may not be necessary. In contrast, since various numerologies are supported in the NR system, information on the numerologies may be additionally necessary. Further, in contrast with the LTE system, a control signal may not be transmitted at a fixed location in the NR system, and thus information on a transmission area for a control channel and a transmission area for a data channel may be additionally necessary. In the NR system, the NAICS may be applied even to a control channel through the information on the additional control channel. For low latency and high Doppler support, one or more DM-RS structures can be supported in the NR system, and additional interference information for the DM-RS structure may be necessary. Further, in case of the NR system, due to used subcarrier spacing and transmission time interval (TTI), the interference occurrence time and frequency units may not be fixed in contrast with the LTE system. Accordingly, for effective interference control in the NR system, the terminal should be able to know at least one of the following transmission parameters. In other words, at least one of the following transmission parameters may be configured as a network support transmission parameter used for the interference control in the NR system.

Network deployment information of an interference cell
Information on whether an interference cell corresponds to an LTE system or an NR system
Numerology information: Subcarrier spacing
Frame structure information
Synchronization information between base stations
Subframe (or slot) number information
Cyclic prefix information
Uplink/downlink configuration information
Dynamic transmission information related to an interference cell
Control channel (e.g., PDCCH) transmission area (or data channel (e.g., PDSCH) transmission area)
Control channel information
Modulation order
Rank indicator (RI): The number of transmission streams of an interference cell
Precoding matrix indicator (PMI): Precoding information of an interference cell
Demodulation reference signal (DM-RS) information
DM-RS structure information: Front-loaded RS, additional RS
DM-RS antenna port (DM-RS AP) information
DM-RS sequence information: Virtual cell ID, scrambling ID
Channel state information reference signal (CSI-RS) information
CSI-RS information of an interference cell: The number of CSI-RS antenna ports or the like
Transmission mode of an interference cell
Supported transmission mode: Transmit diversity scheme, spatial multiplexing scheme
Scheduling information of an interference cell
Transmission time interval information: Slot or multiple slots
PRB pair unit of an interference cell: {1,2,3,4}
Resource allocation bandwidth on frequency may differ in accordance with a used numerology.
Precoding granularity may be assumed as a resource allocation unit of an interference cell.

However, only parts of the parameters may be transferred from the base station to the terminal through signaling, and other information may be directly acquired by the terminal through blind detection. For example, the terminal may acquire network deployment information of an interference cell and a part of scheduling information of the interference cell (e.g., PRB pair unit of the interference cell) through signaling with a serving base station, and may acquire dynamic information related to the interference cell through the blind detection. Further, with respect to specific information (e.g., transmission mode of the interference cell), the base station may perform signaling of a candidate set of possible values that the parameter corresponding to the specific information can have, to the terminal and the terminal may acquire the specific information through blind detection of the candidate values of the parameter.

Figure 4:
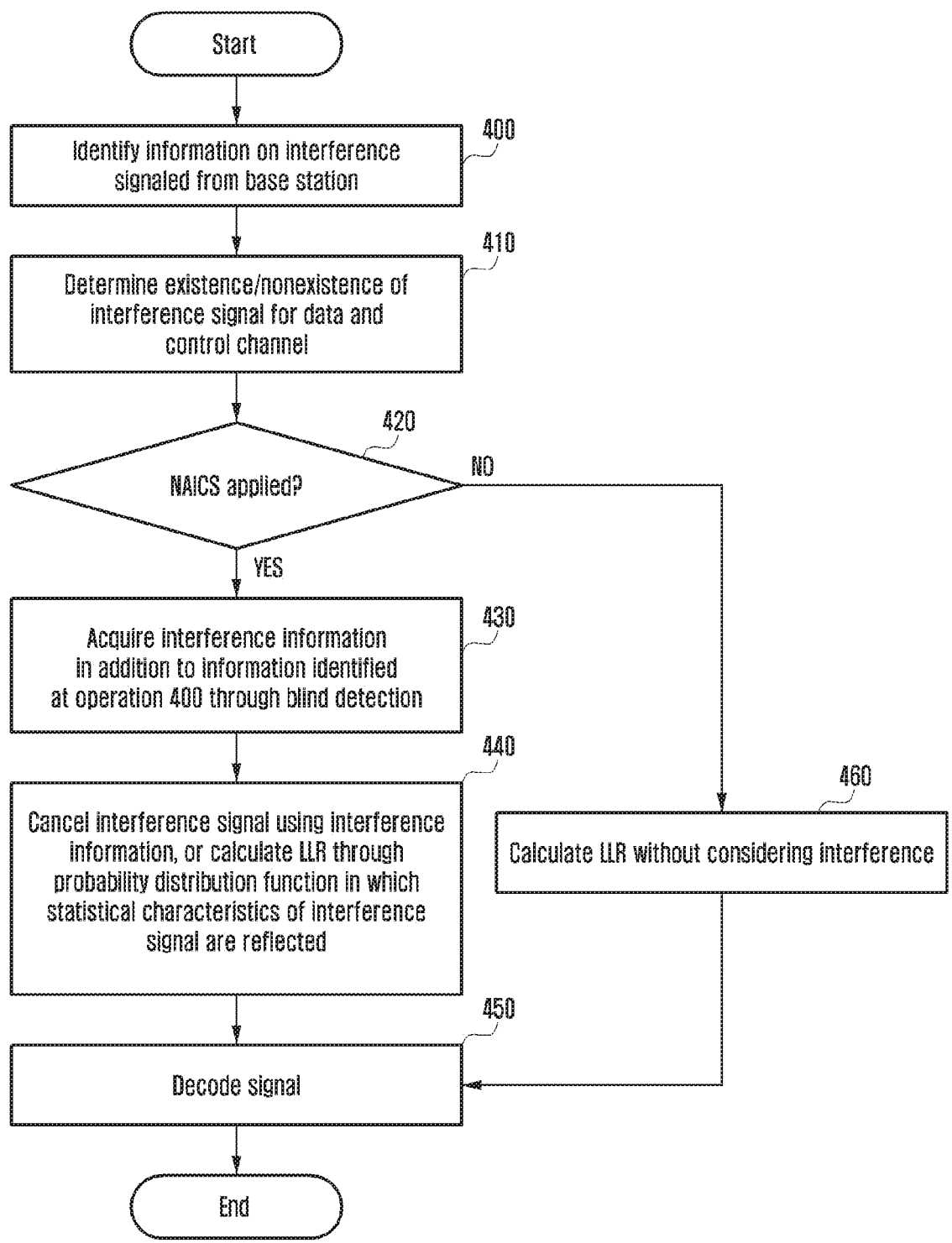
FIG. 4 is a diagram explaining an operation of a terminal according to embodiment 1 of the disclosure.

FIG. 4 is a diagram explaining an operation of a terminal according to embodiment 1 of the disclosure.

Referring to FIG. 4, a terminal identifies interference information signaled from a base station (400). A part of the interference information may be transferred from the base station to the terminal through higher layer signaling (e.g., radio resource control (RRC)). If necessary, a part of the interference information may be transferred from the base station to the terminal through dynamic signaling (e.g., downlink control information (DCI)).

If the interference information signaled from the base station is identified (400), the terminal identifies existence/nonexistence of an interference signal for data and a control channel (410), and determines whether to apply NAICS with respect to the data and the control channel (420).

If it is determined to apply the NAICS, the terminal acquires other interference information in addition to the interference information signaled from the base station (400) through blind detection (430). The terminal cancels the interference signal using the interference information acquired through operations 400 and 430, or calculates an LLR through a probability distribution function in which the statistical characteristics of the interference signal are reflected (440). Last, the terminal decodes data and a control signal (450) after cancelling or suppressing the interference signal.

In contrast, if it is determined that the NAICS is not applied at operation 420, the terminal calculates the LLR without considering the interference (460), and decodes the data and the control signal (450).

A signaling method for information on whether the interference cell corresponds to the LTE system or the NR system among the interference information will be described in more detail in embodiment 2 below.

Embodiment 2

Through embodiment 1 as described above, the network supportable transmission parameters necessary for the interference control in the NR system have been described. In embodiment 2, explanation will be made around operations necessary for effectively applying the NAICS in case where the existing LTE system and the NR system coexist. First, in an environment in which the existing LTE system and the NR system coexist, terminals may be classified into terminals supporting only LTE, terminals supporting both LTE and NR, and terminals supporting only NR.

Figure 5A:
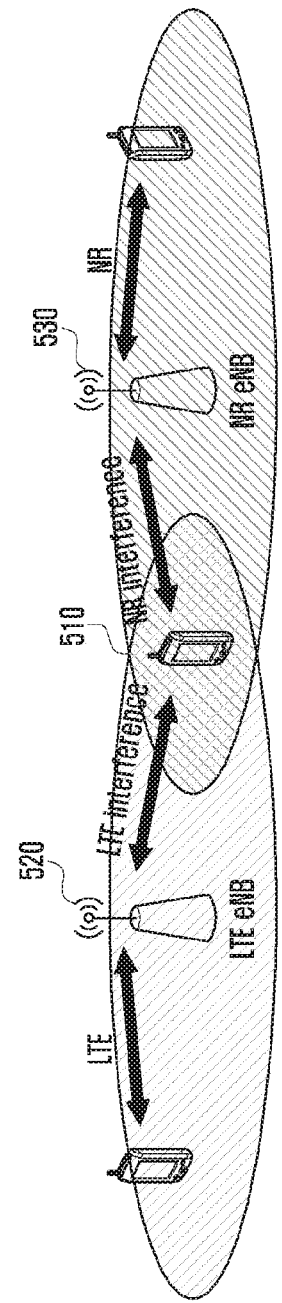
FIGS. 5A and 5B are diagrams explaining an example of a situation in which interference occurs with respect to a terminal that supports both LTE and NR in a deployment scenario in which an LTE (or LTE-A) system and an NR system coexist through cooperation between base stations according to embodiment 2 of the disclosure.
Figure 5B:
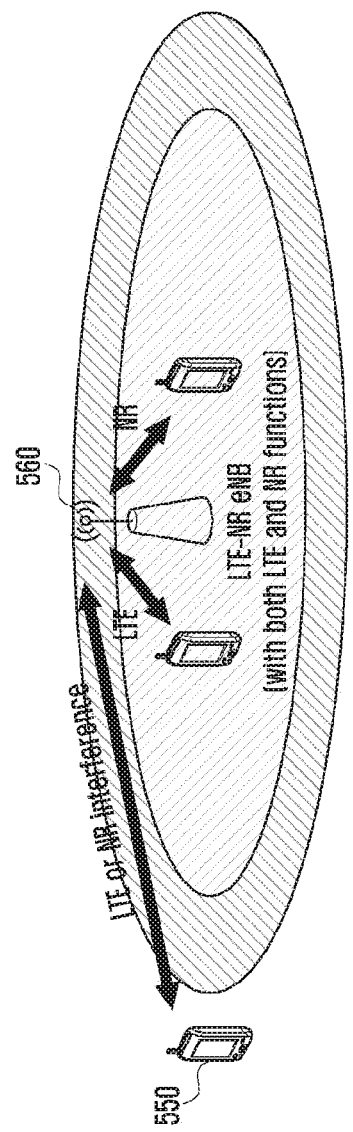

FIGS. 5A and 5B are diagrams explaining an example of a situation in which interference occurs with respect to a terminal that supports both LTE and NR in a deployment scenario in which an LTE (or LTE-A) system and an NR system coexist through cooperation between base stations according to embodiment 2 of the disclosure.

FIG. 5A shows a deployment scenario in which one base station supports an LTE system or an NR system, that is, an LTE base station and an NR base station exist separately. Referring to FIG. 5A, in case where a terminal 510 receives a signal from an LTE base station 520, a signal from an NR base station 530 acts as the interference. In contrast, in case where the terminal 510 receives a signal from the NR base station 530, the signal from the LTE base station 520 acts as the interference. Accordingly, in case where the terminal 510 applies the NAICS with respect to the interference of an adjacent cell, it is necessary to know whether the corresponding interference is the interference from the NR system or the interference from the LTE system.

FIG. 5B shows a deployment scenario in which one base station supports both the LTE system and the NR system. Referring to FIG. 5B, an NR signal or an LTE signal from the base station 560 may act as the interference with respect to the terminal 550.

Method 1: Signaling of NR Interference Information

According to method 1, the base station can perform signaling of NR interference information. The terminal supporting only LTE is unable to recognize signaling according to method 1, that is, the NR interference information. However, the terminal supporting NR can recognize the NR interference information. The terminal supporting both LTE and NR can determine that the corresponding interference is the interference occurring from the NR base station through the NR interference information without any additional operation for identifying whether the interference occurrence corresponds to the interference from the LTE base station or the interference from the NR base station, and can perform the NAICS using the NR interference information. The terminal supporting only NR can also perform the NAICS using the NR interference information.

Method 2: Signaling of LTE Interference Information

According to method 2, the base station can perform signaling of LTE interference information. The terminal supporting LTE can perform the NAICS using the LTE interference information. Further, the terminal supporting both LTE and NR can determine that the corresponding interference is the interference occurring from the LTE base station through the LTE interference information without any additional operation for identifying whether the interference occurrence corresponds to the interference from the LTE base station or the interference from the NR base station. However, the terminal supporting only NR is unable to recognize the signaling according to method 2, that is, the LTE interference information.

Method 3: Signaling of NR Interference Information and LTE Interference Information According to method 3, the base station can perform signaling of NR interference information and LTE interference information. The terminal supporting LTE can perform the NAICS using the LTE interference information, and the terminal supporting NR can perform the NAICS using the NR interference information. On the other hand, according to method 3, the terminal supporting both LTE and NR can perform an additional operation for identifying whether the interference occurrence corresponds to the interference from the LTE base station or the interference from the NR base station, and can perform the NAICS.

Through the proposed methods 1, 2, and 3, the base station can indirectly or implicitly notify the terminal of existence/nonexistence of the interference from the NR base station or the interference from the LTE base station.

Figure 6:
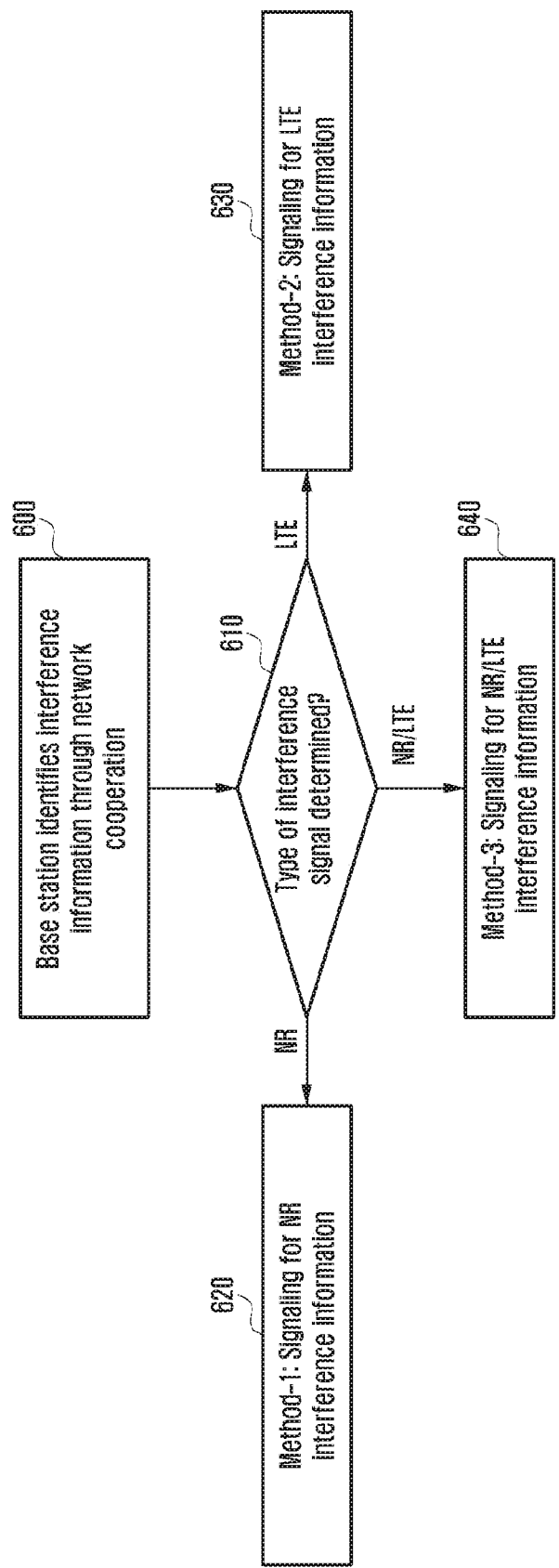
FIG. 6 is a diagram explaining an operation of a base station according to embodiment 2 of the disclosure.

FIG. 6 is a diagram explaining an operation of a base station according to embodiment 2 of the disclosure.

Referring to FIG. 6, a base station identifies interference information through network cooperation (600), and determines the type of an interference signal (610).

If it is determined that the interference signal occurs from an NR base station, the base station performs signaling of NR interference information to a terminal (620). As described above, if the NR interference information is signaled to the terminal supporting both LTE and NR, the corresponding terminal can determine that the corresponding interference is the interference occurring from the NR base station through the NR interference information received from the base station without performing an additional operation (e.g., blind detection) for identifying whether the interference occurrence corresponds to the interference from the LTE base station or the interference from the NR base station, and can apply the NAICS. Accordingly, unnecessary blind detection operation is minimized, and the interference signal control can be performed more accurately to improve the system performance.

If it is determined that the interference signal occurs from the LTE base station, the base station performs signaling of the LTE interference information to the terminal (630). If the LTE interference information is signaled to the terminal supporting both LTE and NR, the corresponding terminal can determine that the corresponding interference is the interference occurring from the LTE base station through the LTE interference information received from the base station without performing an additional operation (e.g., blind detection) for identifying whether the interference occurrence corresponds to the interference from the LTE base station or the interference from the NR base station, and can apply the NAICS.

If it is determined that the interference signal occurs from the NR base station and the LTE base station, the base station performs signaling of the NR interference information and the LTE interference information to the terminal (640). On the other hand, if the interference information is signaled to the terminal supporting both LTE and NR, it is to be noted that the corresponding terminal can apply the NAICS only by performing an additional operation (e.g., blind detection) for identifying whether the interference occurrence corresponds to the interference from the LTE base station or the interference from the NR base station.

Embodiment 3

Through embodiment 1 as described above, it has been described that the base station notifies the terminal of at least parts of the transmission parameters for the interference, such as network deployment information of the interference cell, dynamic transmission information related to the interference cell, and scheduling information of the interference cell through signaling. In embodiment 3, an operation of a terminal according to an embodiment of the disclosure will be described in detail.

Figure 7:
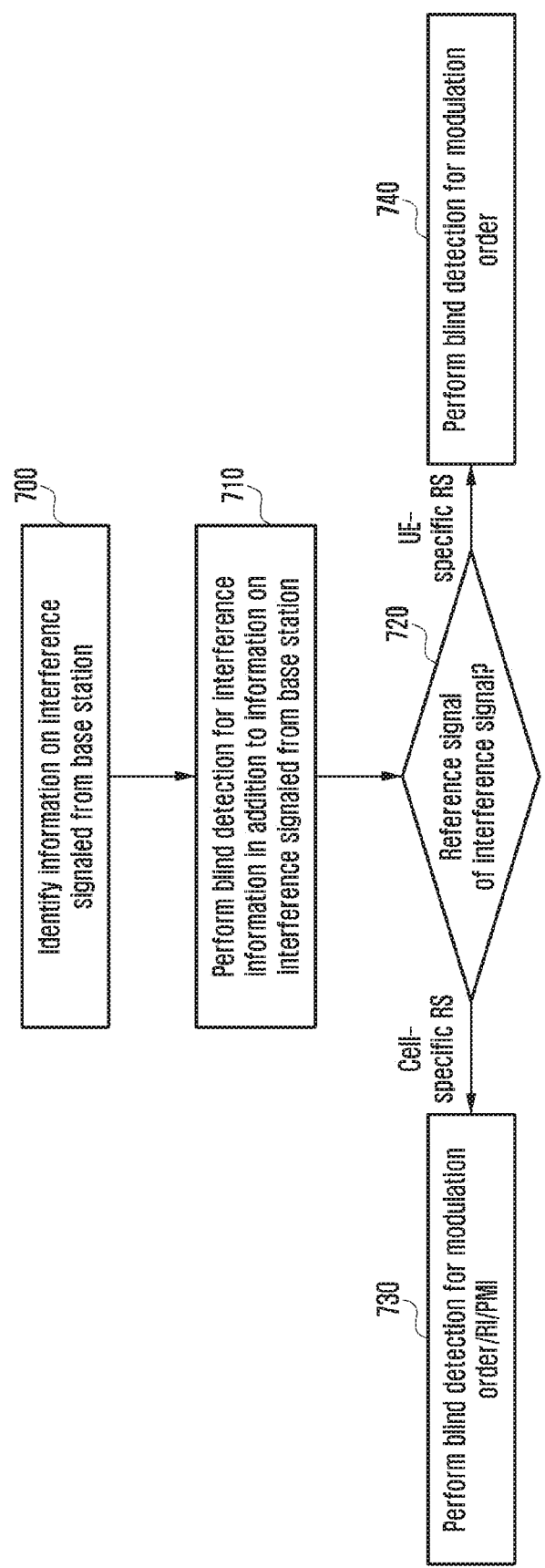
FIG. 7 is a diagram explaining an operation of a terminal according to embodiment 3 of the disclosure.

FIG. 7 is a diagram explaining an operation of a terminal according to embodiment 3 of the disclosure.

Referring to FIG. 7, a terminal identifies interference information signaled from a base station (700), and performs blind detection with respect to interference information in addition to the interference signal information signaled from the base station (710). Through the blind detection, the terminal can identify what reference signal (RS) the interference signal is transmitted based on (720).

If the interference signal is transmitted based on a non-precoded RS, such as a cell-specific RS (e.g., CSR), the terminal cancels the interference signal, or performs blind detection with respect to interference modulation orders and RI PMI in order to calculate a conditional probability distribution function in which the statistical characteristics of the interference signal are reflected (730).

In contrast, if the interference signal is transmitted based on a precoded RS, such as a UE-specific RS (e.g., DM-RS), the terminal performs blind detection for identifying modulation order information (740).

Hereinafter, a detailed operation for performing the blind detection with respect to the modulation order, RI, and PMI will be described. As one of methods for performing the blind detection with respect to the modulation order, RI, and PMI of the interference signal of the terminal, an approximated maximum likelihood (AML) detection method is expressed as in the following mathematical expression 4.

Mathematical expression 4

$$\{\hat{R}, \hat{P}, \hat{S}\} = \arg\max_{\{R, P_R, S_n\}} \left( \frac{1}{N_{RE}} \sum_{k=1}^{N_{RE}} \left( -\frac{1}{\sigma^2} \left\| y_k - \hat{H} P_R s_{min}^{P_R} \right\|^2 \right) - \ln(\pi\sigma^2 |S_n|) \right)$$

In the mathematical expression 4, $\hat{H}_k^j$ is a matrix value estimating a channel on which the interference signal is transmitted, and may be estimated through an RS for the interference cell. R denotes transmitted rank values applicable to the interference signal. $P_R$ denotes possible precoding matrices with respect to rank values of the corresponding R. On the other hand, if it is determined that the interference signal is a UE-specific RS, parameters corresponding to the precoding and ranks can be excluded from the mathematical expression 4. If it is determined that the interference signal is a cell-specific RS, all possible ranks and precoding matrices defined in the LTE system or the NR system with respect to the number of RS antenna ports can be considered as the transmission ranks applicable to the interference signal and the possible precoding matrices with respect to the transmission ranks. As an alternative, it may be considered that sets of possible ranks and precoding matrices are transferred to the terminal in the form of a bitmap through higher layer signaling. That is, if it is identified that the interference cell has M RS antenna ports through identification of RS information of the interference cell, a serving base station may express whether the precoding matrices defined for respective ranks 1 to M are usable as 0 or 1, and then may transfer the bitmaps for the respective ranks to the terminal in a connected form in the order of ranks. For example, if the interference cell has two RS antenna ports, whether to use possible ranks 1 and 2 defined in the LTE system and 4 and 3 possible precoding matrices with respect to the ranks 1 and 2 is expressed by 7-bit bitmap, and this can be transferred from the base station to the terminal through the higher layer signaling. In contrast, if a specific terminal has identified that the interference cell has two RS antenna ports through identification of RS information of the interference cell, but has not received information on the transmission ranks and precoding matrices transferred from the base station and applicable to the interference signal, the corresponding terminal can detect the AML using the mathematical expression 4 with respect to the possible ranks 1 and 2 defined in the LTE and NR systems for a 2-port RS and all precoding matrices defined for the ranks 1 and 2. Referring again to the mathematical expression 4, $S_n$ denotes signal constellation for the modulation order n. In case of the LTE system, it is possible that n is n=2, 4, 6 (or 8), and quadrature phase shift keying (QPSK), 16 quadrature amplitude modulation (16QAM), and 64QAM (or 256QAM) are applied thereto. $|S_n|$ denotes the number of elements in the signal constellation, and is calculated as $|S_n|$ with respect to each n value. Further, $S_{min}^{P_R}$ denotes a symbol having the minimum Euclidean distance from a received vector among the given ranks and the elements in the signal constellation given with respect to the precoding matrices, and can be expressed as in the following mathematical expression 5.

$$s_{min}^{P_R} = \underset{s \in S_n}{\operatorname{argmin}} \|y_k - H_k^l P_R s\|^2 \qquad \text{Mathematical expression 5}$$

If it is determined that the interference signal is the UE-specific RS, the parameters corresponding to the precoding and ranks can be excluded from the mathematical expression 5. If $N_{RE}$ in the mathematical expression 4 and a set of RE samples to be used for the blind detection are determined, the terminal can perform the blind detection with respect to the modulation order, RI, and PMI through the AML detection method. All sets of RE samples to be used by the terminal for the blind detection of the modulation order, RI, and PMI should apply the same modulation order, RI, and PMI, and should have the same power level. Accordingly, the terminal should perform the blind detection using only pure REs excluding the RS, control channel, and muting in the basic unit of the interference scheduling.

On the other hand, the base station and the terminal perform the method according to embodiments 1 to 3 as described above to support the NAICS. If necessary, the embodiments of the disclosure may be operated in combination. For example, portions of embodiments 1 to 3 of the disclosure may be operated in combination.

Specifically, as disclosed in embodiments 1 and 2, the terminal can receive the interference information of a neighboring cell from the serving base station. For example, the terminal can receive, from the serving base station, information on whether the interference cell corresponds to the LTE system or the NR system, that is, network deployment information including information on the type of the neighboring cell. The network deployment information may further include at least one of numerology information of the neighboring cell and frame structure information. Further, the terminal may receive scheduling information of the neighboring cell including information on a transmission time interval of the neighboring cell. At least a part of the interference information of the neighboring cell can be acquired through the blind detection. For example, the terminal can perform the blind detection with respect to dynamic information of the neighboring cell including at least one of control channel information of the neighboring cell and DM-RS structure information.

Further, as disclosed in embodiments 1 to 3, when receiving data from the serving base station, the terminal can cancel or suppress the interference signal from the neighboring cell based on the interference information of the neighboring cell.

In order to support the NAICS, the base station can acquire information on the neighboring cell causing the interference to occur in the terminal through signaling between base stations, and can transmit the information on the neighboring cell to the corresponding terminal. For example, the base station can acquire information on whether the neighboring cell corresponds to the LTE system or the NR system, that is, network deployment information including information on the type of the neighboring cell through signaling between base stations, and can transmit the network deployment information. The network deployment information may further include at least one of the numerology information of the neighboring cell and the frame structure information. Further, the base station can acquire scheduling information including information on the transmission time interval of the neighboring cell, and can transmit the scheduling information to the terminal.

Figure 8:
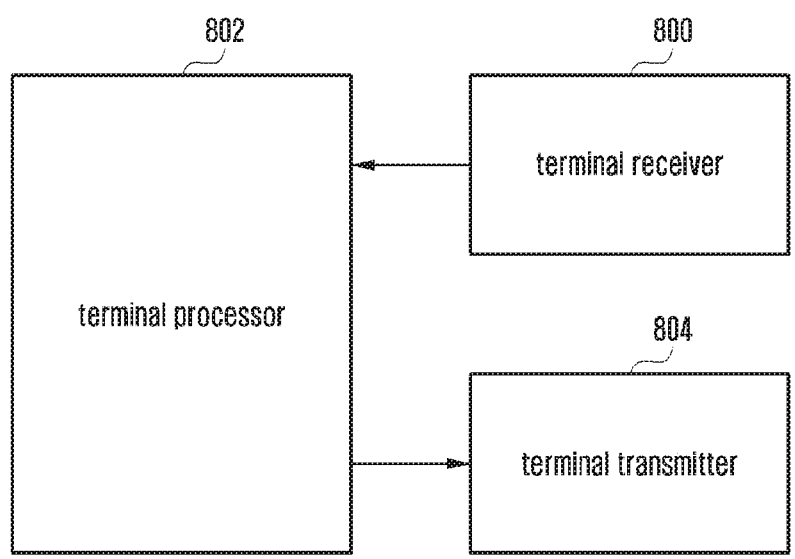
FIG. 8 is a block diagram illustrating the internal structure of a terminal according to an embodiment of the disclosure.
Figure 9:
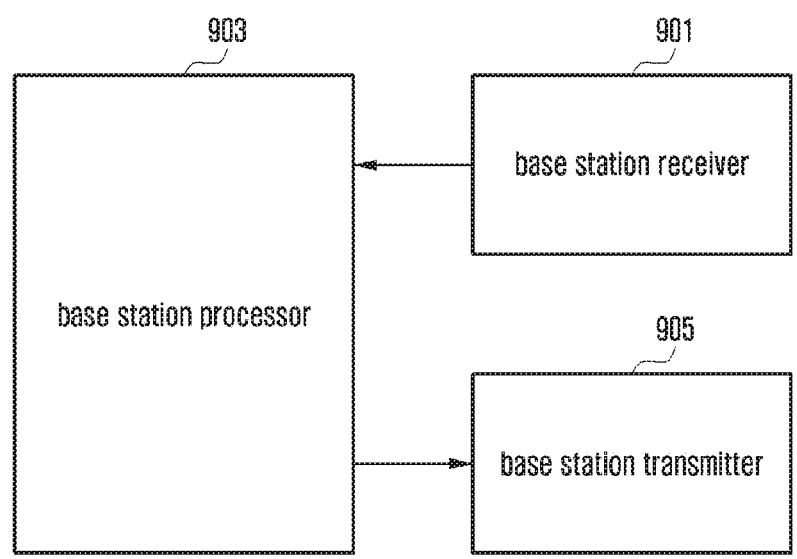
FIG. 9 is a block diagram illustrating the internal structure of a base station according to an embodiment of the disclosure.

FIGS. 8 and 9 are block diagrams illustrating the internal structures of a terminal and a base station according to an embodiment of the disclosure. Receivers, processors, and transmitters of the terminal and the base station in FIGS. 8 and 9 should operate according to the respective embodiments.

Referring to FIG. 8, a terminal according to an embodiment of the disclosure may include a terminal receiver 800, a terminal transmitter 804, and a terminal processor 802. The terminal receiver 800 and the terminal transmitter 804 may be commonly called a transceiver. The transceiver may receive a signal from a base station, and may transmit a signal to the base station. The signal may include control information and data. For this, the transceiver may be composed of a radio frequency (RF) transmitter for up-converting and amplifying the frequency of a transmitted signal, and an RF receiver for low-noise-amplifying and down-converting the frequency of a received signal. Further, the transceiver may receive a signal on a radio channel, and may output the received signal to the terminal processor 802. The transceiver may transmit the signal output from the terminal processor 802 on the radio channel. The terminal processor 802 may control a series of processes for the terminal operation according to the above-described embodiment of the disclosure. For example, the terminal receiver 800 may receive control information from the base station, and may make the terminal processor 802 determine the interference information from the control information. The terminal processor 802 can perform decoding through interference cancellation and suppression by performing blind detection after measuring an interference channel using a certain radio resource and determining whether to perform the blind detection and information on the minimum resource unit for applying the blind detection. Specifically, the terminal processor 802 may be configured to receive network deployment information including information on the type of the neighboring cell from the base station and to cancel and suppress the interference signal from the neighboring cell based on the network deployment information. Further, the terminal processor 802 may be further configured to control to acquire dynamic information of the neighboring cell including at least one of control channel information of the neighboring cell and DM-RS structure information by the blind detection or to receive scheduling information including information on the transmission time interval of the neighboring cell.

Referring to FIG. 9, a base station according to an embodiment of the disclosure may include a base station receiver 901, a base station transmitter 905, and a base station processor 903. The base station receiver 901 and the base station transmitter 905 may be commonly called a transceiver. The transceiver may receive a signal from a terminal, and may transmit a signal to the terminal. The signal may include control information and data. The transceiver may be composed of an RF transmitter for up-converting and amplifying the frequency of a transmitted signal, and an RF receiver for low-noise-amplifying and down-converting the frequency of a received signal. Further, the transceiver may receive a signal on a radio channel, and may output the received signal to the base station processor 903. The transceiver may transmit the signal output from the base station processor 903 on the radio channel. The base station processor 903 may control a series of processes for the base station operation according to the above-described embodiment of the disclosure. For example, the base station processor 903 determines configuration of an interference cell with respect to a specific terminal, configuration of transmission parameters of the interference cell to be transferred to the corresponding terminal, scheduling and resource allocation information. The transmission parameters of the interference cell may include information on the minimum unit of resource allocation to which blind detection can be applied. Specifically, the base station processor 903 may be configured to control to acquire network deployment information including information on a type of the neighboring cell and to transmit the network deployment information to the terminal. Further, the base station processor 903 may be further configured to control to acquire scheduling information of the neighboring cell including information on the transmission time interval of the neighboring cell and to transmit the scheduling information of the neighboring cell to the terminal. The transmission parameters of the interference cell of the terminal determined by the base station are transmitted to the terminal through the base station transmitter 905. In accordance with the scheduling determined by the base station, the base station transmitter 905 transmits control information (i.e., PDCCH transmission) and data (i.e., PDSCH transmission) to the terminal. Further, the base station receives channel state information for scheduling of the terminal using the base station receiver 901.

On the other hand, embodiments of the disclosure disclosed in the specification and the drawings have been presented to assist those of ordinary skill in the art to gain a comprehensive understanding of the disclosure, and do not limit the scope of the disclosure. It will be apparent to those of ordinary skill in the art to which the disclosure pertains that various modifications are possible based on the technical concept of the disclosure. For example, although the embodiments of the disclosure have been described around an LTE system and an NR system in the specification and drawings, it will be apparent to those of ordinary skill in the art to which the disclosure pertains that the embodiments of the disclosure can also be applied to other communication systems having similar technical backgrounds or channel types through partial modifications within a range that does not greatly deviate from the scope of the disclosure.

The invention claimed is:

1. A method performed by a terminal in a communication system, the method comprising:
   receiving, from a base station, information for network assisted interference cancellation and suppression (NAICS), the information including first information indicating whether a neighboring cell is associated with a first system or a second system and second information on numerology associated with the neighboring cell;
   cancelling an interference signal of the neighbor cell from a signal of the base station based on the first information and the second information; and
   decoding the signal from which the interference signal is cancelled.

2. The method of claim 1, further comprising:
   suppressing the interference signal of the neighboring cell from the signal of the base station based on the first information and the second information;
   decoding the signal from which the interference signal is suppressed.

3. The method of claim 1, wherein the information for the NAICS further includes information on a frame structure associated with the neighboring cell.

4. The method of claim 1, further comprising identifying, by blind detection, at least one of information on a control channel associated with the neighboring cell and information on a demodulation reference signal (DM-RS) structure associated with the neighboring cell.

5. The method of claim 1, wherein the information for the NAICS further includes information on a transmission time interval associated with the neighboring cell.

6. A terminal in a communication system, the terminal comprising:
   a transceiver; and
   a processor coupled with the transceiver and configured to:
      receive, from a base station, information for network assisted interference cancellation and suppression (NAICS), the information including first information indicating whether a neighboring cell is associated with a first system or a second system and second information on numerology associated with the neighboring cell,
      cancel an interference signal of the neighbor cell from a signal of the base station based on the first information and the second information, and
      decoding the signal from which the interference signal is cancelled.

7. The terminal of claim 6, wherein the processor is further configured to:
   suppress the interference signal of the neighboring cell from the signal of the base station based on the first information and the second information, and
   decode the signal from which the interference signal is suppressed.

8. The terminal of claim 6, wherein the information for the NAICS further includes information on a frame structure associated with the neighboring cell.

9. The terminal of claim 6, wherein the processor is further configured to identify, by blind detection, at least one of information on a control channel associated with the neighboring cell and information on a demodulation reference signal (DM-RS) structure associated with the neighboring cell.

10. The terminal of claim 6, wherein the information for the NAICS further includes information on a transmission time interval associated with the neighboring cell.

11. A method performed by a base station in a communication system, the method comprising:
    identifying information for network assisted interference cancellation and suppression (NAICS), the information including first information indicating whether a neighboring cell is associated with a first system or a second system and second information on numerology associated with the neighboring cell; and
    transmitting, to the terminal, the information for the NAICS,
    wherein the first information and the second information are used to cancel an interference signal of the neighboring cell from a signal of base station, and
    wherein the signal from which the interference signal is cancelled is decoded.

12. The method of claim 11, wherein the information for the NAICS further includes at least one of information on a frame structure, information on a control channel, information on a demodulation reference signal (DM-RS) structure, and information on a transmission time interval associated with the neighboring cell.

13. A base station in a communication system, the base station comprising:

a transceiver; and a processor coupled with the transceiver and configured to:

identify information for network assisted interference cancellation and suppression (NAICS), the information including first information indicating whether a neighboring cell is associated with a first system or a second system and second information on numerology associated with the neighboring cell, and transmit, to the terminal, the information for the NAICS, wherein the first information and the second information are used to cancel an interference signal of the neighboring cell from a signal of base station, and wherein the signal from which the interference signal is cancelled is decoded.

14. The base station of claim 13, wherein the information for the NAICS further includes information on a frame structure associated with the neighboring cell.

15. The base station of claim 13, wherein the information for the NAICS further includes at least one of information on a control channel associated with the neighboring cell and information on a demodulation reference signal (DM-RS) structure, and information on a transmission time interval associated with the neighboring cell.

* * * * *